(12) United States Patent
Chen et al.

(10) Patent No.: US 9,686,461 B2
(45) Date of Patent: Jun. 20, 2017

(54) IMAGE CAPTURING DEVICE AND AUTOMATIC FOCUSING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jau-Yu Chen, Taipei (TW); Chih-Hsiung Huang, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 244 days.

(21) Appl. No.: 14/490,131

(22) Filed: Sep. 18, 2014

(65) Prior Publication Data

US 2015/0156399 A1    Jun. 4, 2015

(30) Foreign Application Priority Data

Nov. 29, 2013    (TW) .............................. 102143883 A (51) Int. Cl.
H04N 13/02    (2006.01)
H04N 5/232    (2006.01)

(52) U.S. Cl.
CPC ..... H04N 5/23212 (2013.01); H04N 13/0242 (2013.01); H04N 13/0271 (2013.01)

(58) Field of Classification Search
CPC .................................................. H04N 5/23212
USPC ........................................................... 348/48
See application file for complete search history.

(56) References Cited

U.S. PATENT DOCUMENTS

| 2004/0263672 A1* | 12/2004 | Yoshida | ................... | G02B 7/38 348/345 |
| 2014/0267243 A1* | 9/2014 | Venkataraman | ...... | G06T 7/0065 345/419 |

* cited by examiner

Primary Examiner — Leron Beck
(74) Attorney, Agent, or Firm — Li & Cai Intellectual Property (USA) Office (57) ABSTRACT

The present invention illustrates an automatic focusing method. Firstly, through multiple cameras of an image capturing device, a scene is captured, such that multiple images generated corresponding to the cameras are obtained. Then, multiple depth maps are generated according to the images. Next, according to the resolutions of single one or multiple objects in the depth maps, the depth information of the single one or multiple objects in the depth maps can be selected to generate a merged depth map. Then, a target focus distance of the single one object or target focus distances of multiple objects are calculated according to the merged depth map. Next, an actual focus distance of the multi-lenses module associated with the cameras is adjusted according to the target focus distance of the single one object or one of the multiple objects.

22 Claims, 6 Drawing Sheets

IMAGE CAPTURING DEVICE AND AUTOMATIC FOCUSING METHOD THEREOF

BACKGROUND

1. Technical Field

The present disclosure relates to an image capturing device; in particular, to an automatic focusing method executed in the image capturing device which has a plurality of cameras, and an automatic focusing device and the image capturing device which use the automatic focusing method.

2. Description of Related Art

Figure 1:
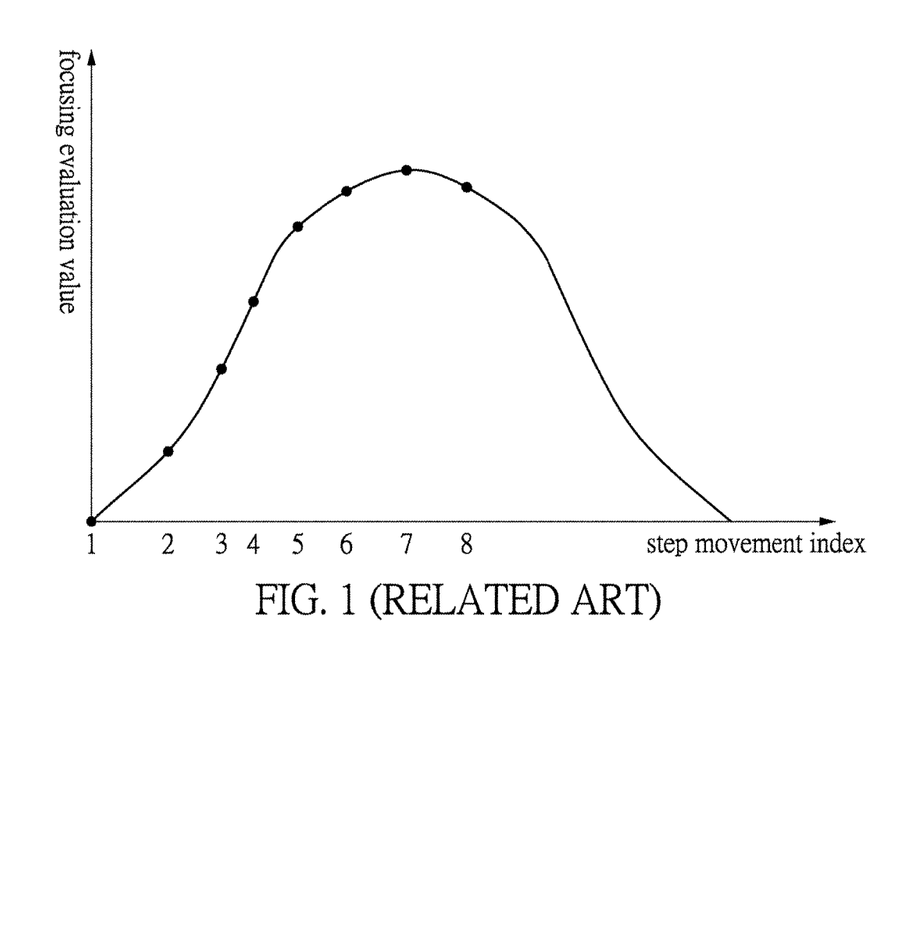
FIG. 1 is a curve diagram showing a focusing evaluation value and a step movement index after the conventional automatic focusing method executed in the image capturing device with a single one lens module moves the lens module each time.

The current image capturing device is usually a digital image capturing device, which can automatically find a focus distance by using at least one of the software, hardware, firmware, such that a photographer can take a picture which has a clear scene. Referring to FIG. 1, FIG. 1 is a curve diagram showing a focusing evaluation value and a step movement index after the conventional automatic focusing method executed in the image capturing device with a single one lens module moves the lens module each time. The conventional automatic focusing method gradually moves the lens module to adjust the focus distance of the lens module and obtain the corresponding focusing evaluation value, such as the contrast or clarity of the image. The conventional automatic focusing method can find the focus distance corresponding to the maximum focusing evaluation value after gradually moving the lens module several times, and the focus distance corresponding to the maximum focusing evaluation value may be the correct focus distance.

In FIG. 1, during the procedure of the first seven lens module movements, the focusing evaluation value which is obtained after the lens module moves current time is larger than the focusing evaluation value which is obtained after the lens module moves previous time. However, the focusing evaluation value which is obtained after the lens module moves eighth time is less than the focusing evaluation value which is obtained after the lens module moves seventh time. The conventional automatic focusing method considers that the focus distance corresponding to the seventh lens module movement may be the correct focus distance corresponding to the scene currently captured by image capturing device, and thus sets the focus distance corresponding to the seventh lens module movement to the focus distance which the image capturing device can capture the scene currently, so as to finish the procedures of the conventional automatic focusing method. It is noted that, the automatic focusing method in the example must capture eight images, and thus the speed for automatic focusing is not fast. In addition, since the conventional automatic focusing method must move the lens module several times, the movement deviation of the actuator is accumulated during the automatic focusing procedure.

SUMMARY

An exemplary embodiment of the present disclosure provides an automatic focusing method executed in an image capturing device. Through multiple cameras of the image capturing device, a scene is captured, so as to obtain multiple images generated corresponding to the cameras, wherein the scene comprises a single one object or multiple objects. Multiple depth maps are generated according to the images, wherein each of the depth map is generated according to the arbitrary two images, and the depth map has depth information of the single one object or at least one of the multiple objects, or does not have the depth information of the single one object or all of the multiple objects. According to resolutions of the single one or the multiple objects in the depth maps, the depth information of the single one or the multiple objects in the depth maps is selected to generate a merged depth map. According to the merged depth map, a target focus distance of the single one object or target focus distances of the multiple objects are calculated. According to the target focus distance of the single one object or one of the target focus distances of the multiple objects, an actual focus distance of the multi-lenses module associated with the cameras is adjusted.

An exemplary embodiment of the present disclosure provides an automatic focusing device adapted to an image capturing device, and the automatic focusing device comprises a merged depth map generating module and a focus distance calculating module, wherein the merged depth map generating module is electrically connected to the image capturing module, and the focus distance calculating module is electrically connected to the merged depth map generating module and the image capturing module. The merged depth map generating module and the focus distance calculating module jointly execute portion of the steps in the automatic focusing method.

An exemplary embodiment of the present disclosure provides an image capturing device comprising an image capturing module and the automatic focusing device, wherein the image capturing module has multiple cameras, and comprises a multi-lenses module, a multi-sensors module, and an actuator module. The image capturing device executes each of the steps in the automatic focusing method.

To sum up, the automatic focusing method, the automatic focusing device and the image capturing device using the method can automatically find the actual focus distance fast and accurately.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

An exemplary embodiment of the present disclosure provides an automatic focusing method adapted to an image capturing device with multiple cameras. The automatic focusing method captures a scene through the cameras to obtain multiple images corresponding to the cameras. The scene can has single one object or multiple objects, and the object can be a background, animal, landmark, human, tree, cloud, mountain, or waterfall. Next, the automatic focusing method can generate multiple depth maps according to the images, wherein each depth map is generated by the arbitrary two images. The depth map has depth information of the single one object or at least one of the multiple objects (if the two images which form the depth map have the single one object or at least the same one of multiple objects), or does not have the depth information of the single one object or all of the multiple objects (if the two images which form the depth map do not have the single one object or at least the same one of multiple objects).

Resolutions of the single one object or the multiple objects in the depth maps are different from each other. According to the resolutions of the single one object or the multiple objects in the depth maps, the automatic focusing method selects depth information of the single one object or the multiple objects in the depth maps to generate a merged depth map.

Concretely, in one exemplary embodiment of the present disclosure, for the single one object or each of the multiple objects, if the object appears in portion or all of the depth maps, the automatic focusing method selects the depth information of the object in the depth map which has a maximum resolution of the object as depth information of the object in the merged depth map. For the single one object or each of the multiple objects, if the object merely appears in one of the depth maps, the automatic focusing method selects the depth information of the object in the depth map as the depth information of the object in the merged depth map.

In addition, one of implementations for selecting the depth information of the object in the depth map which has the maximum resolution of the object as the depth information of the object in the merged depth map is described as follows.

For the single one object or each of the multiple objects, if the object appears in the portion or all of the depth maps, the automatic focusing method compares the resolutions of the object in the depth maps, and selects the depth information of the object in the depth map which has a maximum resolution of the object as the depth information of the object in the merged depth map. For the single one object or each of the multiple objects, if the object merely appears in one of the depth maps, the automatic focusing method selects the depth information of the object in the depth map as the depth information of the object in the merged depth map.

Notably, the implementation for generating the merged depth map not limited to the manner for selecting the depth information of the object in the depth map which has a maximum resolution of the object as the depth information of object in the merged depth map. The other implementations for generating the merged depth map are illustrated as follows.

In another exemplary embodiment of the present disclosure, for the single one object or each of the multiple objects, if the object appears in the portion or all of the depth maps, the automatic focusing method selects the depth information of the object in one of the depth maps which have the resolutions of the object larger than a threshold resolution as depth information of the object in the merged depth map. For the single one object or each of the multiple objects, if the object merely appears in one of the depth maps, the automatic focusing method selects the depth information of the object in the depth map as the depth information of the object in the merged depth map.

In addition to the implementation for generating the merged depth map, another implementation for generating the merged depth map is illustrated as follows. In another exemplary embodiment of the present disclosure, for the single one object or each of the multiple objects, if the object appears in the portion or all of the depth maps, the automatic focusing method performs a weighting calculation on the depth information of the object in the depth maps which have the resolutions of the object larger than the threshold resolution, and selects weighted depth information of the object as depth information of the object in the merged depth map. For the single one object or each of the multiple objects, if the object merely appears in one of the depth maps, the automatic focusing method selects the depth information of the object in the depth map as the depth information of the object in the merged depth map.

In addition to the implementation for generating the merged depth map, another implementation for generating the merged depth map is illustrated as follows. In another exemplary embodiment of the present disclosure, for the single one object or each of the multiple objects, if the object appears in the portion or all of the depth maps, the automatic focusing method performs the weighting calculation on the depth information of the object in the depth maps which have the resolutions of the object within top ranks (for example, the top 60%, but the present disclosure is not limited thereto), and selects weighted depth information of the object as depth information of the object in the merged depth map. For the single one object or each of the multiple objects, if the object merely appears in one of the depth maps, the automatic focusing method selects the depth information of the object in the depth map as the depth information of the object in the merged depth map.

After the merged depth map is generated, the automatic focusing method calculates a target focus distance of the single one object or target focus distances of the multiple objects according to the merged depth map. Next, the automatic focusing method adjusts an actual focus distance of the multi-lenses module associated with the cameras according to the target focus distance of the single one object or one of the target focus distances of the multiple objects (selected by the user manually or the automatic focusing device automatically), wherein the automatic focusing method can adjust the actual focus distance of the multi-lenses module once or step by step, and the present disclosure is not limited thereto.

In addition, an exemplary embodiment of the present disclosure provides an automatic focusing device adapted to an image capturing device having multiple cameras. The automatic focusing device has a merged depth map generating module and a focus distance calculating module. The merged depth map generating module generates the merged depth map by using the mentioned manner. The focus distance calculating module calculates the target focus distances by using the mentioned manner. In addition, the automatic focusing device further comprises a control interface to allow the user select one of the target focus distances of the multiple objects, and to transmit the selected one of the target focus distances of the multiple objects to the actuator module, such that the actuator module can adjust the actual focus distance of the multiple-lenses module associated with the cameras.

An exemplary embodiment of the present disclosure further provides an image capturing device using said automatic focusing method, wherein the image capturing device has the image capturing module and the automatic focusing device which have multiple cameras.

Accompanying with drawings, the automatic focusing method, module, and the image capturing device are illustrated as follows. However, the following exemplary embodiments are not intended to limit the present disclosure.

[Exemplary Embodiment of Image Capturing Device]

Figure 2:
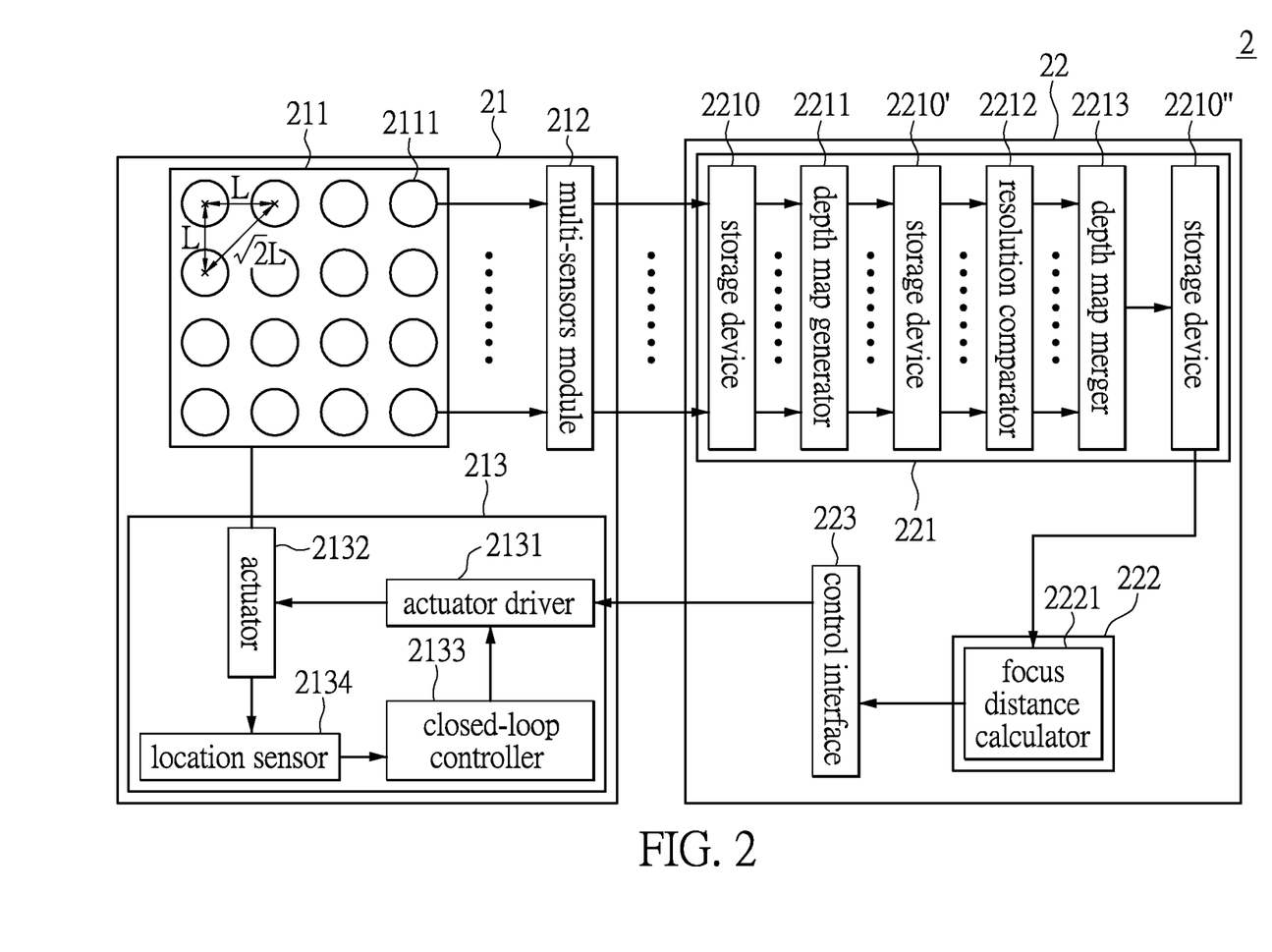
FIG. 2 is a schematic diagram showing an image capturing device according to an exemplary embodiment of the present disclosure.

Referring to FIG. 2, FIG. 2 is a schematic diagram showing an image capturing device according to an exemplary embodiment of the present disclosure. The image capturing device 2 comprises an image capturing module 21 and an automatic focusing device 22, wherein the image capturing module 21 is electrically connected to the automatic focusing device 22.

The image capturing module 21 has multiple cameras, and the cameras can be a camera array, which has multiple lenses and corresponding sensing units arranged as an N×M array. One of the lenses corresponds to one of the sensing units. The distance between the two neighboring lenses on the horizontal or vertical direction is L, and the distance between two neighboring lenses on diagonal direction is $\sqrt{2}L$. The image capturing module 21 captures a scene through the cameras to obtain multiple images corresponding to the cameras, wherein the scene can have single one object or multiple objects.

In the exemplary embodiment, N and M are integers larger than or equal to 1, but a product of N and M are larger than or equal to 3. For example, M and N can be 4. Though the cameras in the exemplary embodiment of FIG. 2 can be the camera array, the present disclosure does not limit the arrangement of the cameras, and the cameras is not limited to be the camera array.

The automatic focusing device 22 receives the images, and generates multiple depth maps according to the images, wherein the depth map is generated from the arbitrary two images, and the depth map has depth information of the single one object or at least the same one of the multiple objects in the corresponding two images. The automatic focusing device 22 selects the depth information of the single one or the multiple objects in the depth maps to generate a merged depth map according to resolutions of the single one or the multiple objects in the depth maps. In other words, whether the depth information of the single one object or each of the multiple objects in the depth maps can be selected to generate the merged depth map is determined based on the resolutions of the single one object or each of the multiple objects in the depth maps. By the way, the resolution of the single one object or each of the multiple objects is related to the distance of two lenses 2111 associated with the two corresponding images of the depth map.

One implementation that the automatic focusing device generates the merged depth map is illustrated as follows. For the single one object or each of the multiple objects, if the object appears in the portion or all of the depth maps, the automatic focusing device 22 finds the depth map having a maximum resolution of the object, and selects the depth information of the object in the found depth map as the depth information of object in the merged depth map, that is, the depth information of the object in the depth map which has the maximum resolution of the object is selected to the merged depth map. For the single one object or each of the multiple objects, if the object merely appears in one of the depth maps, the automatic focusing device 22 directly selects the depth information of the object in the depth map as the depth information of the object in the merged depth map.

Specifically, for the single one object or each of the multiple objects, if the object appears in portion or all of the depth maps, the automatic focusing device 22 compares the resolutions of the object in the depth maps, and selects the depth information of the object in the depth map which has the maximum resolution of the object as the depth information of the merged depth map. For the single one object or each of the multiple objects, if the object merely appears in one of the depth maps, the automatic focusing device 22 directly selects the depth information of the object in the depth map as the depth information of the object in the merged depth map.

It is noted that, the present disclosure does not limit to select the depth information of the object in the depth map which has the maximum resolution of the object as the depth information of the merged depth map. Another implementation for generating the merged depth map is illustrated as follows.

In another implementation for generating the merged depth map, for the single one object or each of the multiple objects, if the object appears in the portion or all of the depth maps, the automatic focusing device 22 performs a weighting calculation on the depth information of the object in the depth maps which have the resolutions of the object within top ranks, and selects the weighted depth information of the object as the depth information of the object in the merged depth map. For the single one object or each of the multiple objects, if the object merely appears in one of the depth maps, the automatic focusing device 22 directly selects the depth information of the object in the depth map as the depth information of the object in the merged depth map.

In another implementation for generating the merged depth map, for the single one object or each of the multiple objects, if the object appears in the portion or all of the depth maps, the automatic focusing device 22 compares the resolutions of the object in the depth maps with the threshold resolution, and randomly selects the depth information of the object in one of the depth maps which have the resolutions of the object larger than the threshold resolution as the depth information of the object in the merged depth map. For the single one object or each of the multiple objects, if the object merely appears in one of the depth maps, the automatic focusing device 22 directly selects the depth information of the object in the depth map as the depth information of the object in the merged depth map.

In another implementation for generating the merged depth map, for the single one object or each of the multiple objects, if the object appears in the portion or all of the depth maps, the automatic focusing device 22 performs the weighting calculation on the depth information of the object in the depth maps which have the resolutions of the object larger than the threshold resolution, and selects the weighted depth information of the object as the depth information of the object in the merged depth map. For the single one object or each of the multiple objects, if the object merely appears in one of the depth maps, the automatic focusing device 22 selects the depth information of the object in the depth map as the depth information of the object in the merged depth map.

Next, the automatic focusing device 22 calculates a target focus distance of the single one object or focus distances of the multiple objects according to the depth information of the single one object or the multiple objects in the merged depth map, and the target distance of the single one object or one of the multiple objects is transmitted to actuator module 213, such that the actuator module 213 can adjust an actual focus distance of the cameras associated with the multi-lenses module 211 (i.e. the actual focus distance of the lenses 2111) according to the target focus distance of the single one object or one of the multiple objects.

One implementation of the image capturing module 21 is illustrated as follows, and the present disclosure is not limited thereto. The image capturing module 21 comprises a multi-lenses module 211, a multi-sensors module 212, and an actuator module 213, wherein the multi-lenses module 211 is connected to the actuator module 213, the actuator module 213 is electrically connected to the automatic focusing device 22, and the multi-sensors module 212 is electrically to the automatic focusing device 22. The multi-lenses module 211 and the multi-sensors module 212 form the cameras, and the cameras can be the camera array.

The multi-lenses module 211 has multiple lenses 2111 arranged as an array, wherein the distance between the two neighboring lenses 2111 on the horizontal or vertical direction is L, and the distance between the two neighboring lenses 2111 on the diagonal direction is $\sqrt{2}L$. The sensing units of the multi-sensors module 212 capture the scene on the images by using the multi-lenses module 211.

Each of the sensing units associated with the multi-sensors module 212 corresponds to one of the lenses 2111. In the exemplary embodiment, the sensing units of the multi-sensors module 212 can be arranged as an N×M array (N rows and M columns), and the present disclosure does not limit the arrangement of the sensing units. The multi-sensors module 212 generates the images according to the light collected from the lenses 2111. Each of the sensing units associated with the multi-sensors module 212 further has a color filter module comprising a red, blue, green color filter for example, and the color filter module can further filter infrared ray. Notably, the present disclosure does not limit the type of the color filter module.

The actuator module 213 receives the target focus distance of the single one object or one of the multiple objects, which is calculated by the automatic focusing device 22. The actuator module 213 adjusts the actual focus distance of the multi-lenses module 211 associated with the cameras according to the received target focus distance, so that the actual focus distance of the multi-lenses module 211 can be equal to the received target focus distance.

The actuator module 213 in the exemplary embodiment can be a closed-loop actuator module, and the present disclosure is not limited thereto. The actuator module 213 in other exemplary embodiment can be an open-loop actuator module. In FIG. 2, the actuator module 213 comprises an actuator driver 2131, an actuator 2132, a closed-loop controller 2133, and a location sensor 2134, wherein the actuator driver 2131 is electrically connected to the automatic focusing device 22, the actuator driver 2131 is electrically connected to the actuator 2132 and the closed-loop controller 2133, the actuator 2132 is connected to the multi-lenses module 211, and the location sensor 2134 is electrically connected to the closed-loop controller 2133.

The actuator driver 2131 receives the feedback signal from the closed-loop controller 2133 and the target focus distance of the single one object or one of the multiple objects, which is calculated by the automatic focusing device 22, so as to generate a driving signal to the actuator 2132 according to the feedback signal and the received target focus distance. The actuator 2132 receives the driving signal, and adjusts the actual focus distance of the multi-lenses module 211 according to the driving signal. The location sensor 2134 senses the actual focus distance of the multi-lenses module 211, through directly sensing the location of the multi-lenses module 211 or the act of the actuator 2132 for example, and generates a location signal to the closed-loop controller 2133. The closed-loop controller 2133 generates the feedback signal to actuator driver 2131 according to the location signal, such that the actuator module 213 can accurately adjust the actual focus distance of the multi-lenses module 211 to be the received target focus distance.

One implementation of the automatic focusing device 22 is illustrated as follows, and the present disclosure does not limit the implementation of the automatic focusing device 22. The automatic focusing device 22 can be implemented by at least one of the software, hardware, and firmware. The automatic focusing device 22 comprises a merged depth map generating module 221, a focus distance calculating module 222, and a control interface 223, wherein the merged depth map generating module 221 is electrically connected to the focus distance calculating module 222 and the multi-sensors module 212 of image capturing module 21, and the control interface 223 is electrically connected to the focus distance calculating module 222 and the actuator module 213 of the image capturing module 21.

The merged depth map generating module 221 receives the images corresponding to the cameras, and generates the depth maps according to the images, wherein the depth map is generated according to the arbitrary two images, and the depth map has depth information of the single one object or at least one of the multiple objects (if the two images which form the depth map have the single one object or at least the same one of multiple objects), or does not have the depth information of the single one object or all of the multiple objects (if the two images which form the depth map do not have the single one object or at least the same one of multiple objects). Next, the merged depth map generating module 221 selects the depth information of the single one or the multiple objects in the depth maps to generate a merged depth map according to resolutions of the single one or the multiple objects in the depth maps.

The focus distance calculating module 222 calculates a target focus distance of the single one object or target focus distances of the multiple objects according to the merged depth map, wherein the target focus distance of the single one object or one of the target focus distances of the multiple objects is used to adjust the actual focus distance of the multi-lenses module 212 associated with the cameras. The control interface 223 allows the user to select the target focus distance of the single one object or one of the target focus distances of the multiple objects, or automatically selects the target focus distance of the single one object or one of the target focus distances of the multiple objects according to a system default selection command, and transmits the selected target focus distance of the object to the actuator module 213.

One implementation of the merged depth map generating module 221 is illustrated as follow, and the present disclosure does not limit the implementation of the merged depth map generating module 221. The merged depth map generating module 221 comprises storage devices 2210, 2210', 2210", a depth map generator 2211, a resolution comparator 2212, and a depth map merger 2213, wherein the storage device 2210 is electrically connected between the multi-sensors module 212 and the depth map generator 2211, the storage device 2210' is electrically connected between the depth map generator 2211 and the resolution comparator 2212, the depth map merger 2213 is electrically connected between the resolution comparator 2212 and the storage device 2210", and the storage device 2210" is electrically connected to the focus distance calculating module 222.

The storage device 2210 stores the images which the cameras capture the scene, the storage device 2210' stores the depth maps, and the storage device 2210" stores the merged depth map. The storage devices 2210, 2210', and 2210" belong to the portion of the merged depth map generating module 221 in the exemplary embodiment, but however can be the external storage devices connected to the merged depth map generating module 221 in one other exemplary embodiment. Furthermore, the storage devices 2210, 2210', and 2210" in the exemplary embodiment are three independent devices, but however the storage devices 2210, 2210', and 2210" can be integrated into one storage device in one other exemplary embodiment for storing the images, depth maps, and merged depth map. In short, the number and type of the storage devices 2210, 2210', and 2210" are not used to limit the present disclosure.

The depth map generator 2211 receives the images corresponding to the cameras, and generates the depth maps according to the images, and the storage device 2210' stores the depth maps. Each depth map is generated by the arbitrary two images. The depth map has depth information of the single one object or at least one of the multiple objects (if the two images which form the depth map have the single one object or at least the same one of multiple objects), or does not have the depth information of the single one object or all of the multiple objects (if the two images which form the depth map do not have the single one object or at least the same one of multiple objects). Specifically, if the two images have the single object or at least the same one of the multiple objects, the locations of the same object in the two images are not the same one since the two images correspond to the different lens modules 2111. By using the difference between the locations of the same object in the two images, the depth information of the object can be obtained, and depth map is thus generated accordingly.

One implementation for identifying whether the two images have the same object is illustrated as follows. The currently used object identifying method, such as face identifying method or one other known object identifying method can be used to extract the objects in the two images, and then calculate the correlation of the objects of the two images to determine whether the two images have the same object. However, the present disclosure does not limit the implementation for identifying whether the two images have the same object, and the person with ordinary skill in the art may select one other implementation for identifying whether the two images have the same object.

In one exemplary embodiment, for the single one object or each of the multiple objects, if the object appears in the portion or all of the depth maps, the resolution comparator 2212 compares the resolutions of the object in the depth maps to find the depth map having the maximum resolution of the object. Then, the depth map merger 2213 determines and selects the depth information of the object in the depth map which has the maximum resolution of the object as the depth information of object in the merged depth map according to the comparison result of the resolution comparator 2212. Thus, the depth information of the single one object and each of the multiple objects in the merged depth map is the depth information of the object in the depth map which has the maximum resolution of the object. For the single one object or each of the multiple objects, if the object merely appears in one of the depth maps, the merged depth map generating module 221 directly selects the depth information of the object in the depth map as the depth information of the object in the merged depth map.

For example, there are three depth maps generated, wherein both the first and second depth maps have the depth information of objects A and B, and the third depth map has the depth information of objects A, B, and C. Assuming the resolution of the object A in the first depth map is larger than those in the second and third depth maps, the depth information of the object A in the first depth map is selected to the merged depth map (i.e. the depth information of the object A in the merged depth map is the same as that in the first depth map) after the resolutions of the object A in the three depth maps are compared. Assuming the resolution of the object B in the second depth map is larger than those in the first and third depth maps, the depth information of the object B in the second depth map is selected to the merged depth map (i.e. the depth information of the object B in the merged depth map is the same as that in the second depth map) after the resolutions of the object B in the three depth maps are compared. The resolutions of the object C in the three depth maps will not be compared since merely the third depth map has the object C, and the depth information of the object C is selected to the merged depth map (i.e. the depth information of the object C in the merged depth map is the same as that in the third depth map).

As mentioned above, the present disclosure does not limit to select the depth information of the object in the depth map which has a maximum resolution of the object as the depth information of object in the merged depth map.

In other implementation for generating the merged depth map, at the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the resolution comparator 2212 compares the resolutions of the object in the depth maps, and the depth map merger 2213 performs the weighting calculation on the depth information of the object in the depth maps which have the resolutions of the object within the top ranks to select the weighted depth information of the object as the depth information of the object in the merged depth map. For the single one object or each of the multiple objects, if the object merely appears in one of the depth maps, the depth map merger 2213 directly selects the depth information of the object in the depth map as the depth information of the object in the merged depth map.

In other implementation for generating the merged depth map, for the single one object or each of the multiple objects, if the object appears in the portion or all of the depth maps, the resolution comparator 2212 compares the resolutions of the object in the depth maps with the threshold resolution, and the depth map merger 2213 selects the depth information of the object in one of the depth maps which have the resolution of the object larger than the threshold resolution as the depth information of the object in the merged depth map. For the single one object or each of the multiple objects, if the object merely appears in one of the depth maps, the depth map merger 2213 directly selects the depth information of the object in the depth map as the depth information of the object in the merged depth map.

In other implementation for generating the merged depth map, for the single one object or each of the multiple objects, if the object appears in the portion or all of the depth maps, the resolution comparator 2212 compares the resolutions of the object in the depth maps with the threshold resolution, and the depth map merger 2213 performs the weighting calculation on the depth information of the object in the depth maps which have the resolutions of the object larger than the threshold resolution and selects the weighted depth information of the object as the depth information of the object in the merged depth map. For the single one object or each of the multiple objects, if the object merely appears in one of the depth maps, the depth map merger 2213 directly selects the depth information of the object in the depth map as the depth information of the object in the merged depth map.

Take the implementation for performing the weighting calculation on the depth information of the object in the depth maps which have resolutions of the object within the top ranks and selecting the weighted depth information of the object as the depth information of the object in the merged depth map as the example. When the image capturing module 21 have eight cameras, 28 ($C_2^8$) images are generated accordingly. Assuming the object A appears in the first, second, fourth, fifth, and ninth depth maps, the object B appears in the $14^{th}$, $15^{th}$, $16^{th}$, $19^{th}$, and $20^{th}$ depth maps, the rank of the resolutions of the object A in these depth maps is the second, fourth, ninth, fifth, and first depth maps, and the rank of the resolutions of the object B in these depth maps is the $20^{th}$, $16^{th}$, $19^{th}$, $15^{th}$, and $14^{th}$ depth maps, the depth map merger 2213 performs the weighting calculation on the depth information of the object A in the second, fourth, and ninth depth maps (the top 60% for example), and on the depth information of the object B in the $20^{th}$, $16^{th}$, and $19^{th}$ depth maps and selects the weighted depth information of the objects A and B as the depth information of the objects A and B in the merged depth map.

Take the implementation for selecting the depth information of the object in one of the depth maps which have the resolutions of the object larger than the threshold resolution as depth information of the object in the merged depth map as the example. When the image capturing module 21 have eight cameras, 28 ($C_2^8$) images are generated accordingly. Assuming the object A appears in the fourth, fifth, and ninth depth maps, the object B appears in the $14^{th}$, $15^{th}$, $19^{th}$, and $20^{th}$ depth maps, the resolutions of the object A in the fifth and ninth depth maps are larger than the threshold resolution, and the resolutions of the object B in the $14^{th}$, $15^{th}$, $19^{th}$, and $20^{th}$ depth maps are larger than the threshold resolution, the depth map merger 2213 selects the depth information of the object A in one of the fifth and ninth depth maps as the depth information of the object A in the merged depth map, and selects the depth information of the object B in one of the $14^{th}$, $15^{th}$, $19^{th}$, and $20^{th}$ depth maps as the depth information of the object B in the merged depth map.

Take the implementation for performing the weighting calculation on the depth information of the object in the depth maps which have resolutions of the object larger than the threshold resolutions and selecting the weighted depth information of the object as the depth information of the object in the merged depth map as the example. When the image capturing module 21 have eight cameras, 28 ($C_2^8$) images are generated accordingly. Assuming the object A appears in the fourth, fifth, and ninth depth maps, the object B appears in the $14^{th}$, $15^{th}$, $19^{th}$, and $20^{th}$ depth maps, the resolutions of the object A in the fifth and ninth depth maps are larger than the threshold resolution, and the resolutions of the object B in the $14^{th}$, $15^{th}$, $19^{th}$, and $20^{th}$ depth maps are larger than the threshold resolution, the depth map merger 2213 performs the weighting calculation on the depth information of the object A in the fifth and ninth depth maps, and on the depth information of the object B in the $14^{th}$, $15^{th}$, $19^{th}$, and $20^{th}$ depth maps and selects the weighted depth information of the objects A and B as the depth information of the objects A and B in the merged depth map.

One implementation of the focus distance calculating module 222 is illustrated as follows, but the present disclosure does not limit the implementation of the focus distance calculating module 222. The focus distance calculating module 222 comprises a focus distance calculator 2221, wherein the focus distance calculator 2221 electrically connected between the control interface 223 and the storage device 2210".

The focus distance calculator 2221 obtains the merged map, and extracts the depth information of the single one object or the multiple objects, and calculates the target focus distance of the object according to the depth information of the object and transmits the target focus distance of the object to the control interface 223. The control interface 223 can allow the user to select one of the target focus distances of the multiple objects calculated by the focus distance calculator 2221, and then transmits the selected target focus distance to the actuator module 213. The actuator module 213 adjusts the actual focus distance of the multi-lenses module 211 according to the target focus distance of the single one object or the selected one of the multiple objects.

It can be known that, the automatic focusing device 22 in the exemplary embodiment can finish focusing procedure in short time, even before the image processing is finished. The automatic focusing device 22 can be implemented by at least one of the software, hardware, and firmware. For example, the automatic focusing device 22 is implemented by the incorporation of the software and firmware, such the cameras of the image capturing device 2 can perform automatic focusing without modifying the hardware of circuits. Furthermore, since the image capturing device 2 has at least three cameras, the focusing accuracy can be enhanced. Moreover, the actuator module 213 can be selectively implemented by the closed-loop actuator module, so as to accurately set the actual focus distance of the multi-lenses module 211 associated with the cameras to be the received target focus distance.

[Exemplary Embodiment of Image Capturing Module]

Figure 3:
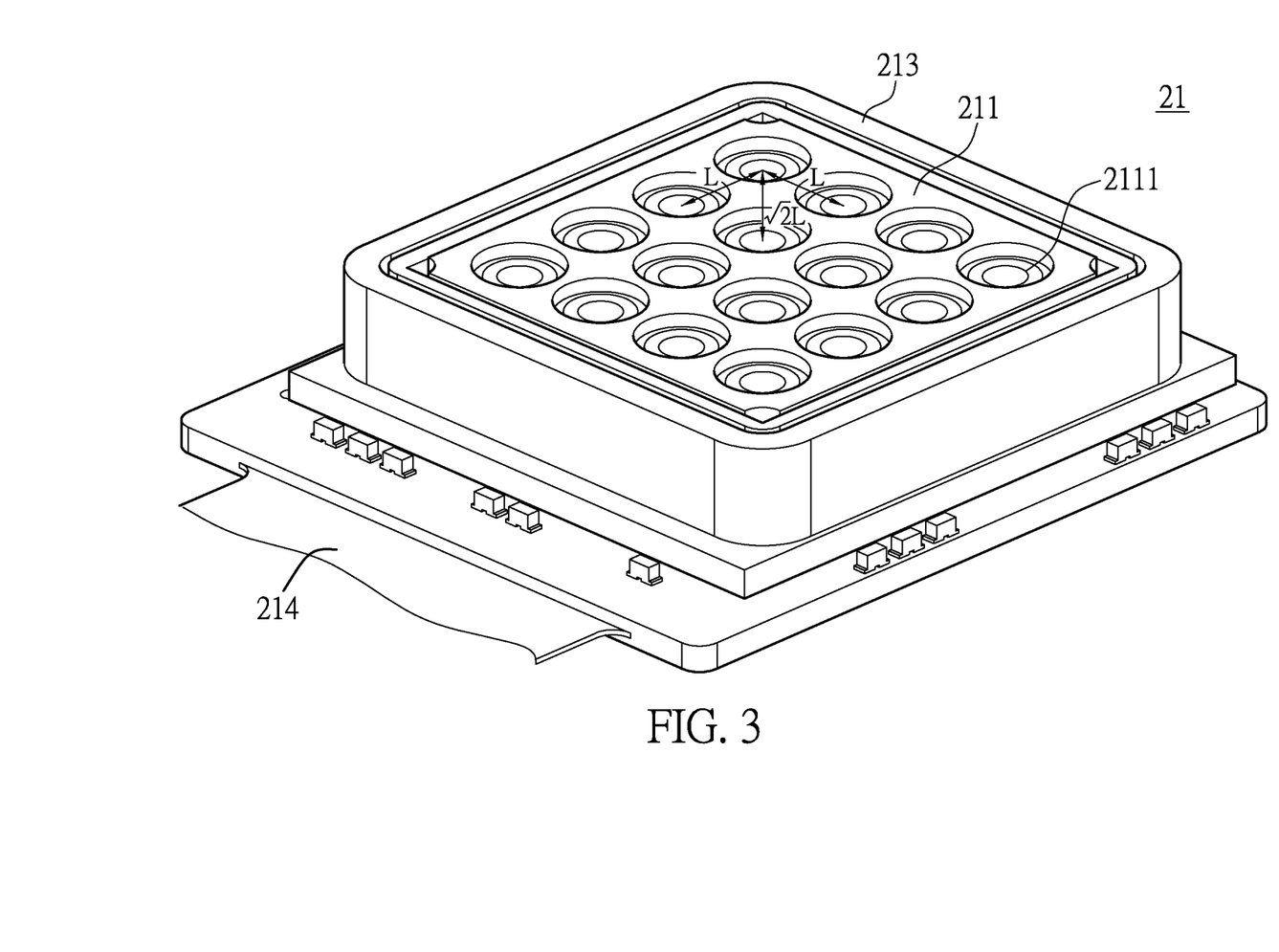
FIG. 3 is a schematic diagram showing an image capturing module according to an exemplary embodiment of the present disclosure.

One exemplary embodiment as follows is given to illustrate implementation of the image capturing module 21, but the present disclosure does not limit the implementation of the image capturing module 21.

Referring to FIG. 2 and FIG. 3, FIG. 3 is a schematic diagram showing an image capturing module according to an exemplary embodiment of the present disclosure. The image capturing module 21 comprises a multi-lenses module 211, a multi-sensors module 212 and an actuator module 213. The multi-lenses module 211 comprises multiple lenses 2111 arranged as an array, wherein the distance between the two lens modules 2111 on the horizontal or vertical direction is L, and the distance between the two lens modules 2111 on the diagonal direction is $\sqrt{2}L$. The multi-sensors module 212 has multiple sensing units correspondingly disposed under the lens modules 2111, wherein each lenses 2111 corresponds to one of the sensing units, such that the cameras can capture the scene to generate the images through the sensing units and the lenses 2111. The actuator module 213 in the exemplary embodiment can be a voice motor module, and the actuator 2132 can be a voice coil motor. The actuator driver 2131 drives the actuator 2132 to move upward or downward, and thus the actual focus distance of the multi-lenses module 211 can be adjusted. In one other exemplary embodiment, the actuator module 213 can be a shape memory alloys actuator module, and the actuator 2132 can be a shape memory alloys actuator. The image capturing module 21 may further comprise a flexible bus 214 to electrically connect the image capturing module 21 and the automatic focusing device 22. The image capturing module 21 can also comprise an optic image stabilizer (not shown in drawings) to make the image capturing module 21 have the optic anti-shake function.

[Exemplary Embodiment of Automatic Focusing Method]

Figure 4:
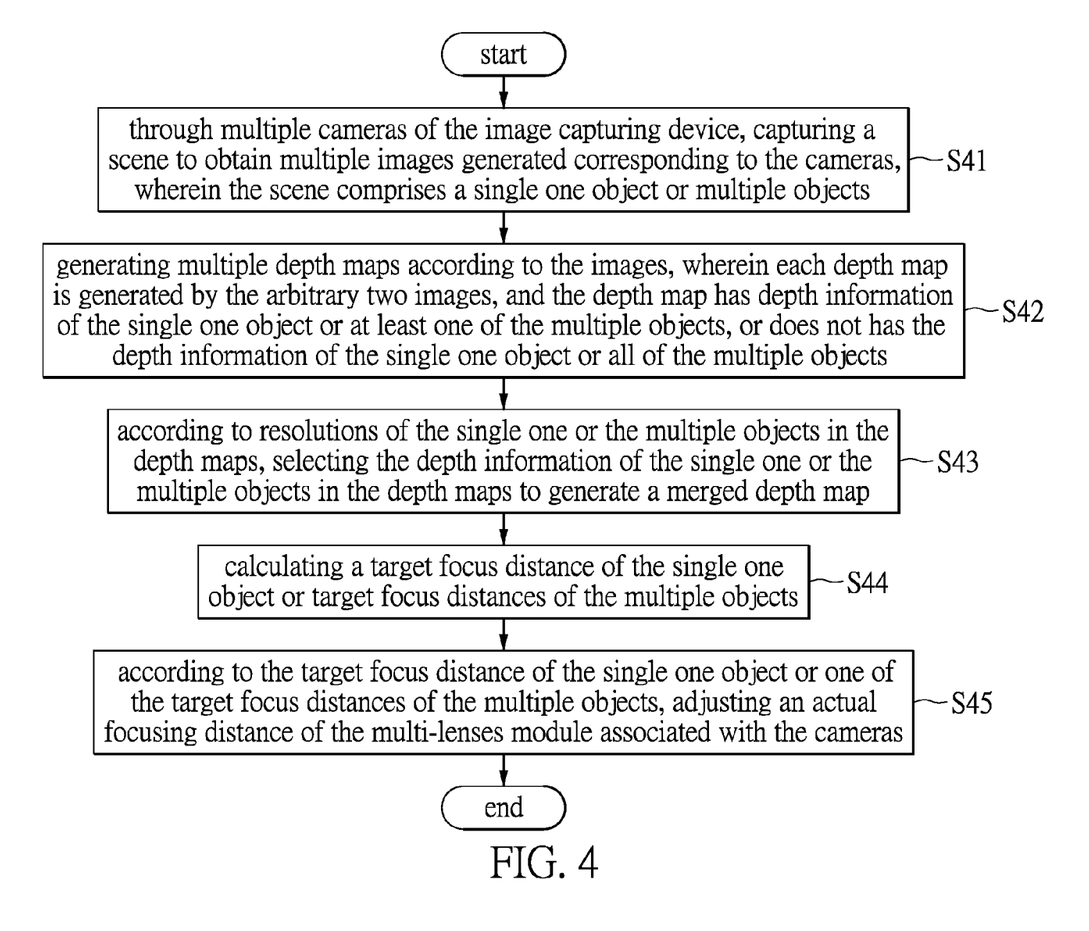
FIG. 4 is a schematic diagram showing an automatic focusing method according to an exemplary embodiment of the present disclosure.

Referring to FIG. 4, FIG. 4 is a schematic diagram showing an automatic focusing method according to an exemplary embodiment of the present disclosure. The automatic focusing method in FIG. 4 can be executed in the image capturing device, such as the image capturing device 2 of FIG. 2. At step S41, through multiple cameras of the image capturing device 2, a scene is capture to obtain multiple images generated corresponding to the cameras, wherein the scene comprises a single one object or multiple objects. At step S42, the automatic focusing device 22 generates multiple depth maps according to the images, wherein each depth map is generated by the arbitrary two images. The depth map has depth information of the single one object or at least one of the multiple objects (if the two images which form the depth map have the single one object or at least the same one of multiple objects), or does not have the depth information of the single one object or all of the multiple objects (if the two images which form the depth map do not have the single one object or at least the same one of multiple objects).

At step S43, according to resolutions of the single one or the multiple objects in the depth maps, the automatic focusing device 22 selects the depth information of the single one or the multiple objects in the depth maps to generate a merged depth map. The details how the depth information of the single one or the multiple objects in the depth maps is selected to generate a merged depth map according to the resolutions of the single one or the multiple objects in the depth maps are illustrated above, thus omitting the redundant descriptions.

At step S44, according to the merged depth map, the automatic focusing device 22 calculates a target focus distance of the single one object or target focus distances of the multiple objects. At step S45, according to the target focus distance of the single one object or one of the target focus distances of the multiple objects, the actuator module 213 adjusts an actual focus distance of the multi-lenses module associated with the cameras. Several usage scenarios are given to explain the execution of the automatic focusing method in following descriptions, and the following usage scenarios do not limit the present disclosure.

[Schematic Usage Scenario Executing of Automatic Focusing Method for Schematic Usage Scenarios]

Figure 5A:
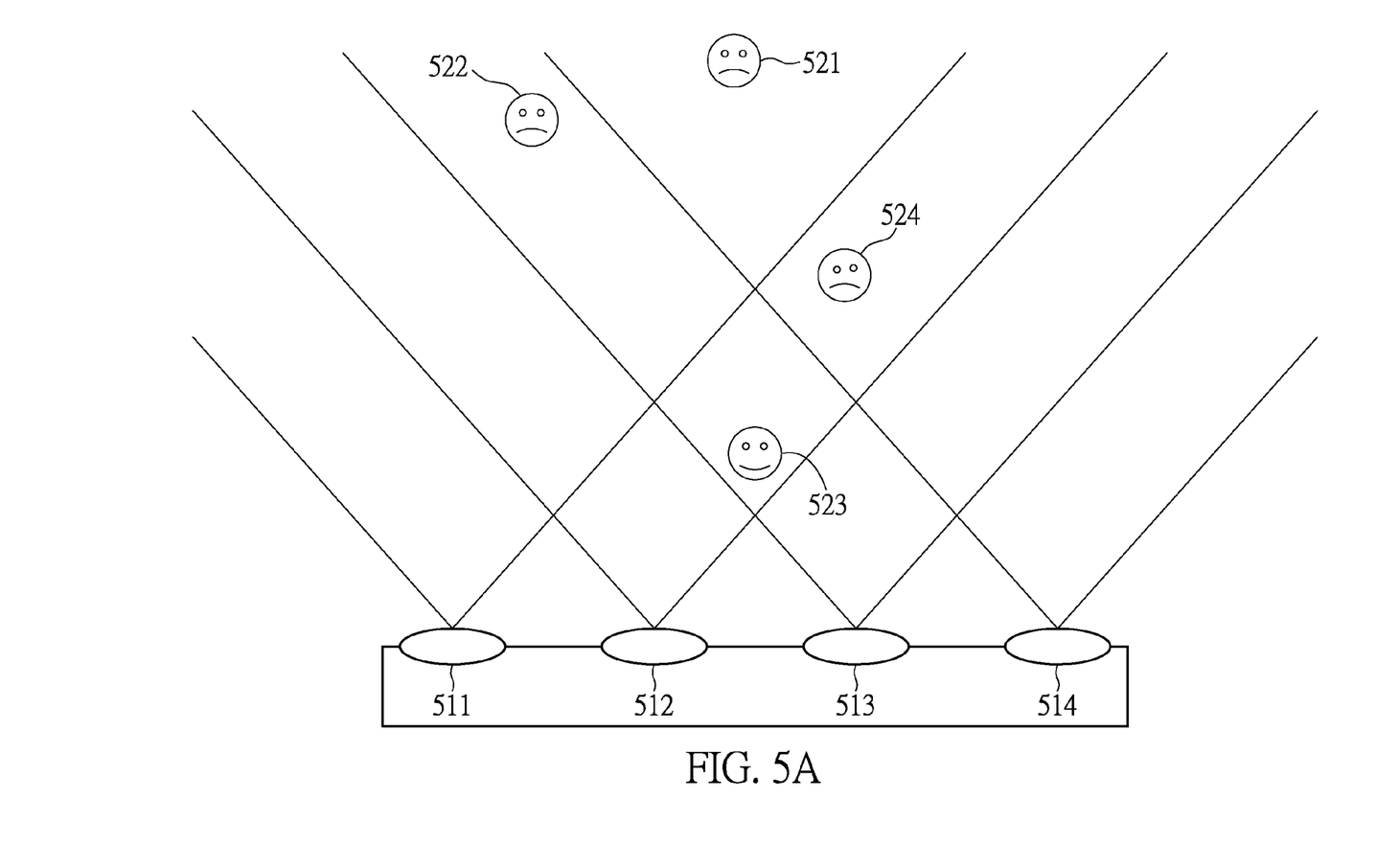
FIG. 5A is a schematic diagram showing the usage scenario of the automatic focusing method for an actual scene according to an exemplary embodiment of the present disclosure.

Referring to FIG. 5A, FIG. 5A is a schematic diagram showing the usage scenario of the automatic focusing method for an actual scene according to an exemplary embodiment of the present disclosure. In FIG. 5A, the image capturing device has the cameras arranged as an 1×4 array, and the four cameras respectively have the lenses 511 through 514, wherein the view angles of the lenses are presented as the slope lines, and four objects 521 through 524 appear in the scene of FIG. 5A.

Regarding the lens 511, the objects 521, 522 locate within the view angle of the lens 511 (i.e. the objects 523 and 524 locate outside the view angle of the lens 511), and the image corresponding to the lens 511 has the objects 521 and 522. Regarding the lens 512, the objects 521 through 524 locate within the view angle of the lens 512, the image corresponding to the lens 512 has the objects 521 through 523 since the object 523 shadows the object 524. Regarding the lens 513, though the objects 521 through 524 locate within the view angle of the lens 513, the image corresponding to the lens 513 has the objects 521, 523, and 524 since the object 523 shadows the object 522. Regarding the lens 514, the objects 521, 524 locate within the view angle of the lens 514 (i.e. the objects 522 and 523 locate outside the view angle of the lens 514), and the image corresponding to the lens 514 has the object 524 since the object 524 shadows the object 521.

The automatic focusing method generate six ($C_2^4$) depth maps according to the four images corresponding to the lenses 511 through 514. The images corresponding to the lenses 511 and 512 can be used to generate a first depth map having the depth information of the objects 521 and 522. The images corresponding to the lenses 512 and 513 can be used to generate a second depth map having the depth information of the objects 521 and 523. The images corresponding to the lenses 513 and 514 can be used to generate a third depth map having the depth information of the object 524. The images corresponding to the lenses 511 and 513 can be used to generate a fourth depth map having the depth information of the object 521. The images corresponding to the lenses 512 and 514 can be used to generate a fifth depth map having no depth information of the objects. The images corresponding to the lenses 511 and 514 can be used to generate a sixth depth map having no depth information of the objects.

In these six depth maps, the first, second, and fourth depth maps have the depth information of the object 521. Since the resolution of the object 521 in the fourth depth map is larger than the resolutions of the object 521 in the first and second depth maps (the distance between the lenses 511 and 512 and the distance between the lenses 512 and 513 are smaller than the distance between the lenses 511 and 513), thus the depth information of the object 521 in the fourth depth map is selected to the merged depth map. The objects 522, 523, and 524 merely appear in the first, second, and third depth maps respectively, and thus the depth information of the object 522 in the first depth map, the depth information of the object 523 in the second depth map, and the depth information of the object 524 in the third depth map is selected to the merged depth map. Next, the automatic focusing method can calculate the target focus distance of the objects 521 through 524 according to the depth information of the objects 521 through 524 in the merged depth map. By using the control interface, the user can select one of the target focus distances of the objects 521 through 524 to adjust actual focus distance of the multi-lenses module associated with the cameras (i.e. the actual focus distance of the lenses 511 through 514).

[Another Schematic Usage Scenario Executing of Automatic Focusing Method for Schematic Usage Scenarios]

Figure 5B:
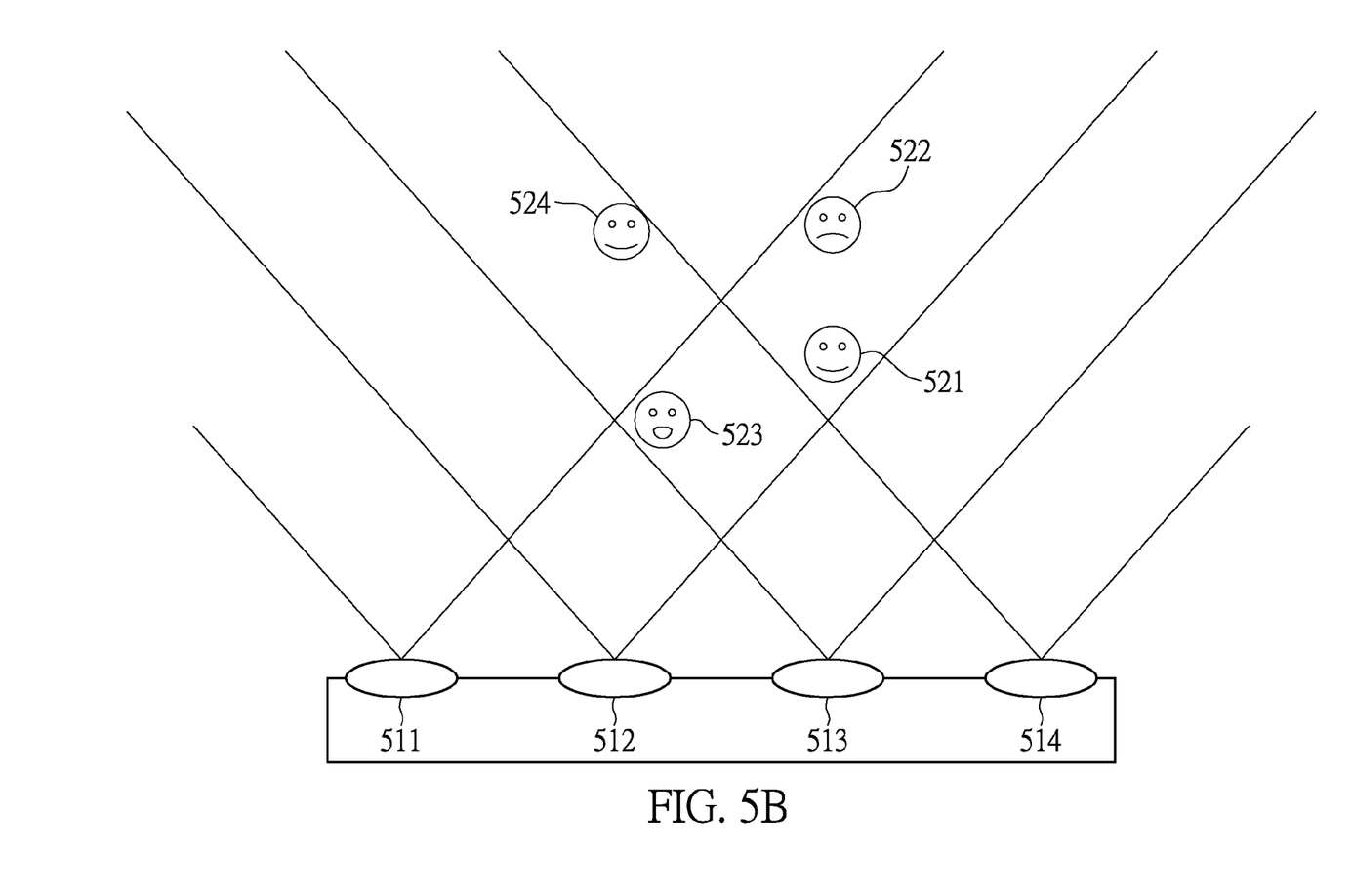
FIG. 5B is a schematic diagram showing the usage scenario of the automatic focusing method for another actual scene according to another exemplary embodiment of the present disclosure.

Referring to FIG. 5B, FIG. 5B is a schematic diagram showing the usage scenario of the automatic focusing method for another actual scene according to another exemplary embodiment of the present disclosure. In FIG. 5B, the image capturing device has the cameras arranged as an 1×4 array, and the four cameras respectively have the lenses 511 through 514, wherein the view angles of the lenses are presented as the slope lines, and four objects 521 through 524 appear in the scene of FIG. 5B.

Regarding the lens 511, the object 524 locates within the view angle of the lens 511 (i.e. the objects 521 through and 523 locate outside the view angle of the lens 511), and the image corresponding to the lens 511 has the object 524. Regarding the lens 512, the objects 521 through 524 locate within the view angle of the lens 512 and do not shadow each other, and the image corresponding to the lens 512 has the objects 521 through 524. Regarding the lens 513, though the objects 521 through 524 locate within the view angle of the lens 513, the image corresponding to the lens 513 has the objects 521, 523, and 524 since the object 521 shadows the object 522. Regarding lens 514, the objects 521 and 522 locate within the view angle of the lens 513 (i.e. the objects 523 and 524 locate outside the lens 514), and the image corresponding to the lens 514 has the objects 521 and 522.

The automatic focusing method generate six ($C_2^4$) depth maps according to the four images corresponding to the lenses 511 through 514. The images corresponding to the lenses 511 and 512 can be used to generate a first depth map having the depth information of the object 524. The images corresponding to the lenses 512 and 513 can be used to generate a second depth map having the depth information of the objects 521, 523, and 524. The images corresponding to the lenses 513 and 514 can be used to generate a third depth map having the depth information of the object 521. The images corresponding to the lenses 511 and 513 can be used to generate a fourth depth map having the depth information of the object 524. The images corresponding to the lenses 512 and 514 can be used to generate a fifth depth map having the depth information of the objects 521 and 522. The images corresponding to the lenses 511 and 514 can be used to generate a sixth depth map having no depth information of the objects.

In these six depth maps, the second, third, and fifth depth maps have the depth information of the object 521. Since the resolution of the object 521 in the fifth depth map is larger than the resolutions of the object 521 in the second and third depth maps (the distance between the lenses 512 and 513 and the distance between the lenses 513 and 514 are smaller than the distance between the lenses 512 and 514), thus the depth information of the object 521 in the fifth depth map is selected to the merged depth map.

The objects 522 and 523 merely appear in the fifth and second depth maps respectively, and thus the depth information of the object 522 in the fifth depth map and the depth information of the object 523 in the second depth map are selected to the merged depth map. The first, second, and fourth depth maps have the depth information of the object 524. Since the resolution of the object 524 in the fourth depth map is larger than the resolutions of the object 524 in the first and third second maps (the distance between the lenses 511 and 512 and the distance between the lenses 512 and 513 are smaller than the distance between the lenses 511 and 513), thus the depth information of the object 524 in the fourth depth map is selected to the merged depth map. Next, the automatic focusing method can calculate the target focus distance of the objects 521 through 524 according to the depth information of the objects 521 through 524 in the merged depth map. By using the control interface, the user can select one of the target focus distances of the objects 521 through 524 to adjust actual focus distance of the multi-lenses module associated with the cameras (i.e. the actual focus distance of the lens modules 511 through 514).

[Technical Results of Exemplary Embodiments]

To sum up, the exemplary embodiments of the present disclosure provide an automatic focusing method, an automatic focusing device, and an image capturing device using the automatic focusing method. The automatic focusing method captures a scene through the cameras of the image capturing device to obtain multiple images corresponding to the cameras, and generates multiple depth maps according to the images. The scene can has single one object or multiple objects, and the depth map has depth information of the single one object or at least one of the multiple objects (if the two images which form the depth map have the single one object or at least the same one of multiple objects), or does not have the depth information of the single one object or all of the multiple objects (if the two images which form the depth map do not have the single one object or at least the same one of multiple objects). According to the resolutions of the single one object or the multiple objects in the depth maps, the automatic focusing method selects depth information of the single one object or the multiple objects in the depth maps to generate a merged depth map. Then, the automatic focusing method calculates a target focus distance of the single one object or target focus distances of the multiple objects according to the merged depth map, and adjusts an actual focus distance of the multi-lenses module associated with the cameras according to the target focus distance of the single one object or one of the target focus distances of the multiple objects to finish automatic focusing.

It can be known that, the automatic focusing method and the automatic focusing device using the automatic focusing method can fast finish the focusing procedure and enhance the focusing accuracy. The automatic focusing method and the automatic focusing device can find the focus distance for a static image of the scene, and further for a dynamic video of the scene. The complexity for implementing the automatic focusing method and the automatic focusing device is not high, and it can be achieved by integrating a small chip in the existed image capturing device having the cameras. The automatic focusing method and the automatic focusing device can further reduce the step movement number of the actuator for focusing and the accumulated movement deviation. In short, the automatic focusing method and the automatic focusing device can be implemented without high complexity, and have the fast focusing speed and accurate focusing ability.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An automatic focusing method, executed in an image capturing device, comprising:

through multiple cameras of the image capturing device, capturing a scene, so as to obtain multiple images generated corresponding to the cameras, wherein the scene comprises a single one object or multiple objects;

generating multiple depth maps according to the images, wherein each of the depth map is generated according to any two of the images, and the depth map has depth information of the single one object or at least one of the multiple objects, or does not have the depth information of the single one object or all of the multiple objects;

according to resolutions of the single one or the multiple objects in the depth maps, selecting the depth information of the single one or the multiple objects in the depth maps to generate a merged depth map;

according to the merged depth map, calculating a target focus distance of the single one object or target focus distances of the multiple objects; and according to the target focus distance of the single one object or one of the target focus distances of the multiple objects, adjusting an actual focus distance of a multi-lenses module associated with the cameras;

wherein in the step "according to the resolutions of the single one or the multiple objects in the depth maps, selecting the depth information of the single one or the multiple objects in the depth maps to generate a merged depth map", for the single one object or each of the multiple objects, if the object appears in portion or all of the depth maps, the depth information of the object in the depth map which has a maximum resolution of the object is selected as depth information of the object in the merged depth map; for the single one object or each of the multiple objects, if the object merely appears in one of the depth maps, the depth information of the object in the depth map is selected as the depth information of the object in the merged depth map.

2. The automatic focusing method according to claim 1, wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the resolutions of the object in the depth maps are compared, and the depth information of the object in the depth map which has a maximum resolution of the object is selected as depth information of object in the merged depth map; for the single one object or each of the multiple objects, if the object merely appears in one of the depth maps, the depth information of the object in the depth map is selected as the depth information of the object in the merged depth map.

3. The automatic focusing method according to claim 1, wherein a number of the cameras is larger than or equal to 3.

4. The automatic focusing method according to claim 1, wherein the cameras are arranged as an N×M array, wherein N and M are integers larger than or equal to 1, but a product of N and M are larger than or equal to 3.

5. An image capturing device, comprising:
an image capturing module, having multiple cameras, and comprising a multi-lenses module, a multi-sensors module, and an actuator module; and
an automatic focusing device, electrically connected to the image capturing module, comprising:
a merged depth map generating module, electrically connected to the image capturing module; and
a focus distance calculating module, electrically connected to the merged depth map generating module and the image capturing module;

wherein the image capturing module executes steps of:
through the cameras, capturing a scene, so as to obtain multiple images generated corresponding to the cameras, wherein the scene comprises a single one object or multiple objects; and
through the actuator module, according to a target focus distance of the single one object or one of target focus distances of the multiple objects, adjusting an actual focus distance of the multi-lenses module associated with the cameras;

wherein the merged depth map generating module executes steps of:
obtaining the images corresponding to the cameras;
generating multiple depth maps according to the images, wherein each of the depth map is generated according to any two of the images, and the depth map has depth information of the single one object or at least one of the multiple objects, or does not have the depth information of the single one object or all of the multiple objects; and
according to resolutions of the single one or the multiple objects in the depth maps, selecting the depth information of the single one or the multiple objects in the depth maps to generate a merged depth map;

wherein the focus distance calculating module executes a step of:
according to the merged depth map, calculating the target focus distance of the single one object or the target focus distances of the multiple objects;

wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the depth information of the object in the depth map which has a maximum resolution of the object is selected as depth information of the object in the merged depth map; for the single one object or each of the multiple objects, if the object merely appears in one of the depth maps, the depth information of the object in the depth map is selected as the depth information of the object in the merged depth map.

6. The image capturing device according to claim 5, wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the resolutions of the object in the depth maps are compared, and the depth information of the object in the depth map which has a maximum resolution of the object is selected as depth information of object in the merged depth map; for the single one object or each of the multiple objects, if the object merely appears in one of the depth maps, the depth information of the object in the depth map is selected as the depth information of the object in the merged depth map.

7. The image capturing device according to claim 5, wherein a number of the cameras is larger than or equal to 3.

8. The image capturing device according to claim 5, wherein the cameras are arranged as an N×M array, wherein N and M are integers larger than or equal to 1, but a product of N and M are larger than or equal to 3.

9. An automatic focusing method, executed in an image capturing device, comprising:
through multiple cameras of the image capturing device, capturing a scene, so as to obtain multiple images generated corresponding to the cameras, wherein the scene comprises a single one object or multiple objects;
generating multiple depth maps according to the images, wherein each of the depth map is generated according to any two of the images, and the depth map has depth information of the single one object or at least one of the multiple objects, or does not have the depth information of the single one object or all of the multiple objects;
according to resolutions of the single one or the multiple objects in the depth maps, selecting the depth information of the single one or the multiple objects in the depth maps to generate a merged depth map;
according to the merged depth map, calculating a target focus distance of the single one object or target focus distances of the multiple objects; and
according to the target focus distance of the single one object or one of the target focus distances of the multiple objects, adjusting an actual focus distance of a multi-lenses module associated with the cameras;
wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the depth information of the object in one of the depth maps which have the resolutions of the object larger than a threshold resolution is selected as depth information of the object in the merged depth map; for the single one object or each of the multiple objects, if the object merely appears in one of the depth maps, the depth information of the object in the depth map is selected as the depth information of the object in the merged depth map.

10. The automatic focusing method according to claim 9, wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, a weighting calculation is performed on the depth information of the object in the depth maps which have the resolutions of the object larger than a threshold resolution, and weighted depth information of the object is selected as depth information of the object in the merged depth map; for the single one object or each of the multiple objects, if the object merely appears in one of the depth maps, the depth information of the object in the depth map is selected as the depth information of the object in the merged depth map.

11. The automatic focusing method according to claim 9, wherein a number of the cameras is larger than or equal to 3.

12. The automatic focusing method according to claim 9, wherein the cameras are arranged as an N×M array, wherein N and M are integers larger than or equal to 1, but a product of N and M are larger than or equal to 3.

13. An automatic focusing method, executed in an image capturing device, comprising:
through multiple cameras of the image capturing device, capturing a scene, so as to obtain multiple images generated corresponding to the cameras, wherein the scene comprises a single one object or multiple objects;
generating multiple depth maps according to the images, wherein each of the depth map is generated according to any two of the images, and the depth map has depth information of the single one object or at least one of the multiple objects, or does not have the depth information of the single one object or all of the multiple objects;
according to resolutions of the single one or the multiple objects in the depth maps, selecting the depth information of the single one or the multiple objects in the depth maps to generate a merged depth map;
according to the merged depth map, calculating a target focus distance of the single one object or target focus distances of the multiple objects; and
according to the target focus distance of the single one object or one of the target focus distances of the multiple objects, adjusting an actual focus distance of a multi-lenses module associated with the cameras;
wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, a weighting calculation is performed on the depth information of the object in the depth maps which have resolutions of the object within top ranks, and weighted depth information of the object is selected as depth information of the object in the merged depth map; for the single one object or each of the multiple objects, if the object merely appears in one of the depth maps, the depth information of the object in the depth map is selected as the depth information of the object in the merged depth map.

14. The automatic focusing method according to claim 13, wherein a number of the cameras is larger than or equal to 3.

15. The automatic focusing method according to claim 13, wherein the cameras are arranged as an N×M array, wherein N and M are integers larger than or equal to 1, but a product of N and M are larger than or equal to 3.

16. An image capturing device, comprising:
an image capturing module, having multiple cameras, and comprising a multi-lenses module, a multi-sensors module, and an actuator module; and
an automatic focusing device, electrically connected to the image capturing module, comprising:
a merged depth map generating module, electrically connected to the image capturing module; and
a focus distance calculating module, electrically connected to the merged depth map generating module and the image capturing module;
wherein the image capturing module executes steps of:
through the cameras, capturing a scene, so as to obtain multiple images generated corresponding to the cameras, wherein the scene comprises a single one object or multiple objects; and
through the actuator module, according to a target focus distance of the single one object or one of target focus distances of the multiple objects, adjusting an actual focus distance of the multi-lenses module associated with the cameras;

wherein the merged depth map generating module executes steps of:
obtaining the images corresponding to the cameras;
generating multiple depth maps according to the images, wherein each of the depth map is generated according to any two of the images, and the depth map has depth information of the single one object or at least one of the multiple objects, or does not have the depth information of the single one object or all of the multiple objects; and
according to resolutions of the single one or the multiple objects in the depth maps, selecting the depth information of the single one or the multiple objects in the depth maps to generate a merged depth map;

wherein the focus distance calculating module executes a step of:
according to the merged depth map, calculating the target focus distance of the single one object or the target focus distances of the multiple objects;

wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, the depth information of the object in one of the depth maps which have the resolutions of the object larger than a threshold resolution is selected as depth information of the object in the merged depth map; for the single one object or each of the multiple objects, if the object merely appears in one of the depth maps, the depth information of the object in the depth map is selected as the depth information of the object in the merged depth map.

17. The automatic focusing method according to claim 16, wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, a weighting calculation is performed on the depth information of the object in the depth maps which have the resolutions of the object larger than a threshold resolution, and weighted depth information of the object is selected as depth information of the object in the merged depth map; for the single one object or each of the multiple objects, if the object merely appears in one of the depth maps, the depth information of the object in the depth map is selected as the depth information of the object in the merged depth map.

18. The automatic focusing method according to claim 16, wherein a number of the cameras is larger than or equal to 3.

19. The automatic focusing method according to claim 16, wherein the cameras are arranged as an N×M array, wherein N and M are integers larger than or equal to 1, but a product of N and M are larger than or equal to 3.

20. An image capturing device, comprising:
an image capturing module, having multiple cameras, and comprising a multi-lenses module, a multi-sensors module, and an actuator module; and
an automatic focusing device, electrically connected to the image capturing module, comprising:
a merged depth map generating module, electrically connected to the image capturing module; and
a focus distance calculating module, electrically connected to the merged depth map generating module and the image capturing module;

wherein the image capturing module executes steps of:
through the cameras, capturing a scene, so as to obtain multiple images generated corresponding to the cameras, wherein the scene comprises a single one object or multiple objects; and
through the actuator module, according to a target focus distance of the single one object or one of target focus distances of the multiple objects, adjusting an actual focus distance of the multi-lenses module associated with the cameras;

wherein the merged depth map generating module executes steps of:
obtaining the images corresponding to the cameras;
generating multiple depth maps according to the images, wherein each of the depth map is generated according to any two of the images, and the depth map has depth information of the single one object or at least one of the multiple objects, or does not have the depth information of the single one object or all of the multiple objects; and
according to resolutions of the single one or the multiple objects in the depth maps, selecting the depth information of the single one or the multiple objects in the depth maps to generate a merged depth map;

wherein the focus distance calculating module executes a step of:
according to the merged depth map, calculating the target focus distance of the single one object or the target focus distances of the multiple objects;

wherein in the step "according to the resolutions of the single one or the multiple objects in the depth maps, selecting the depth information of the single one or the multiple objects in the depth maps to generate a merged depth map", for the single one object or each of the multiple objects, if the object appears in the portion or all of the depth maps, a weighting calculation is performed on the depth information of the object in the depth maps which have resolutions of the object within top ranks, and weighted depth information of the object is selected as depth information of the object in the merged depth map; for the single one object or each of the multiple objects, if the object merely appears in one of the depth maps, the depth information of the object in the depth map is selected as the depth information of the object in the merged depth map.

21. The image capturing device according to claim 20, wherein a number of the cameras is larger than or equal to 3.

22. The image capturing device according to claim 20, wherein the cameras are arranged as an N×M array, wherein N and M are integers larger than or equal to 1, but a product of N and M are larger than or equal to 3.

* * * * *